United States Patent
Kumar et al.

(10) Patent No.: US 12,131,095 B2
(45) Date of Patent: Oct. 29, 2024

(54) SYSTEMS AND METHODS TO OFFLOAD ON-PREMISES KEYBOARD, VIDEO AND MOUSE (KVM) SERVER LIVE VIDEO RENDERING TO MODULAR CHASSIS FRAME BUFFER MEMORY

(71) Applicant: Dell Products, L.P., Round Rock, TX (US)

(72) Inventors: Suren Kumar, Bangalore (IN); Akbar Sheriff, Salem (IN); Michael Emery Brown, Austin, TX (US); Vasantha Kumar Venkataramanappa, Bengaluru (IN)

(73) Assignee: Dell Products, L.P., Round Rock, TX (US)

( * ) Notice: Subject to any disclaimer, the term of this patent is extended or adjusted under 35 U.S.C. 154(b) by 211 days.

(21) Appl. No.: 17/813,052

(22) Filed: Jul. 18, 2022

(65) Prior Publication Data
US 2024/0020079 A1    Jan. 18, 2024

(51) Int. Cl.
G06F 3/14        (2006.01)
G09G 3/00        (2006.01)

(52) U.S. Cl.
CPC ........... *G06F 3/1454* (2013.01); *G09G 3/002* (2013.01); *G09G 2360/18* (2013.01); *G09G 2370/24* (2013.01)

(58) Field of Classification Search
None
See application file for complete search history.

(56) References Cited

U.S. PATENT DOCUMENTS

| | | | |
|---|---|---|---|
| 11,593,052 B1 * | 2/2023 | Michna | G06F 3/03543 |
| 2004/0098532 A1 * | 5/2004 | Huang | G06F 3/023 710/316 |
| 2004/0215617 A1 * | 10/2004 | Ramsey | G06F 3/023 |
| 2005/0105542 A1 * | 5/2005 | Seki | G06F 1/189 370/402 |
| 2007/0132771 A1 * | 6/2007 | Peer | G09G 5/393 345/545 |
| 2008/0059626 A1 * | 3/2008 | Campbell | H04L 43/0817 709/224 |
| 2008/0126627 A1 * | 5/2008 | Chandrasekhar | G06F 3/023 710/62 |
| 2009/0260047 A1 * | 10/2009 | Buckler | H04L 67/1095 725/116 |

* cited by examiner

*Primary Examiner* — Jason A Pringle-Parker
(74) *Attorney, Agent, or Firm* — Fogarty LLP (57) ABSTRACT

A modular server chassis enclosure controller (EC) on-premises keyboard video and mouse module has an EC frame buffer memory and an EC virtual network computing (libvnc) client process. The libvnc fetches an EC frame buffer memory address, displays an on-screen display (OSD) screen to a user and accepts user selection of a blade server deployed in the modular server chassis from the OSD. The libvnc receives a virtual network computing (VNC) streaming session over transport layer security, from a VNC computing server process of the selected blade server. The libvnc determines whether the VNC server process has data to send and, if it does, reads graphics data from the virtual network computing server process and writes the graphics data from the VNC server to the EC frame buffer memory address. The graphics data is displayed on an on-premises monitor coupled to the modular server chassis from the EC frame buffer.

20 Claims, 7 Drawing Sheets

FIG. 8

SYSTEMS AND METHODS TO OFFLOAD ON-PREMISES KEYBOARD, VIDEO AND MOUSE (KVM) SERVER LIVE VIDEO RENDERING TO MODULAR CHASSIS FRAME BUFFER MEMORY

FIELD

This disclosure relates generally to Information Handling Systems (IHSs), and, more specifically, to offloading on-premises keyboard, video and mouse (KVM) server live video rendering to modular chassis frame buffer memory.

BACKGROUND

As the value and use of information continues to increase, individuals and businesses seek additional ways to process and store information. One option available to users is Information Handling Systems (IHSs). An IHS generally processes, compiles, stores, and/or communicates information or data for business, personal, or other purposes thereby allowing users to take advantage of the value of the information. Because technology and information handling needs and requirements vary between different users or applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

IHSs may be installed in a modular chassis, such a modular IHS chassis may support multiple removable IHS blade servers, which are individual IHS servers. Each blade server's Video, Keyboard and Mouse (KVM) is routed through a chassis manager and the chassis manager acts as a KVM switch for all blade servers in the chassis. In contrast, a rack server may employ one-to-one management (e.g., KVM, etc.), whereas a modular IHS server chassis employs one-to-many management (e.g., KVM, etc.). The modular IHS server chassis may have an embedded software-based local KVM option to display video for each blade server, or the like and an embedded systems management. The chassis' centralized KVM interface may provide a video display option for all of the connected blade servers, or the like, and the embedded systems management. The KVM interface may show an On-Screen Display (OSD) screen in response to pressing of a hot-key, which will display all the installed blade servers, or the like and the embedded systems management console. A user may be presented with an option to dynamically switch from one blade server display to another blade server (or to the embedded systems management console) by selecting the device from an OSD menu.

SUMMARY

Embodiments of systems and methods to offload on-premises Keyboard, Video and Mouse (KVM) server live video rendering to modular chassis frame buffer memory are described. In an illustrative, non-limiting example a modular server chassis enclosure controller (EC) on-premises keyboard video and mouse (KVM) module has a modular server chassis frame buffer memory and a modular server chassis enclosure controller virtual network computing (libvnc) client process. This EC may be a one modular server chassis enclosure controller-to-a plurality of blade servers modular server chassis enclosure controller (i.e., a one-to-many enclosure controller) and the libvnc (client) process(es) may be (an) EC library VNC client process(es).

The libvnc fetches an EC frame buffer memory address, displays an on-screen display (OSD) screen to a user and accepts user selection of a blade server deployed in the modular server chassis from the OSD. The libvnc receives a virtual network computing (VNC) streaming session over transport layer security, from a (library) VNC computing server process of the selected blade server. The libvnc determines whether the VNC server process has data to send and, in response to a determination that the VNC server has data to send, reads graphics data from the VNC server process and writes the graphics data from the VNC server to the EC frame buffer memory address. The graphics data is displayed on an on-premises video monitor coupled to the modular server chassis from the EC frame buffer memory.

However, in response to a determination that the VNC server has data to send the libvnc process display the OSD screen to the user.

The libvnc process may also restrict at least a portion of the EC frame buffer memory for use by the libvnc process, write the OSD and/or (a) priority notification(s) to the resultingly restricted EC frame buffer memory, and display, from the restricted EC frame buffer memory, the OSD and/or (a) priority notification(s) on the on-premises video monitor coupled to the modular server chassis.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity and have not necessarily been drawn to scale.

DETAILED DESCRIPTION

Figure 1:
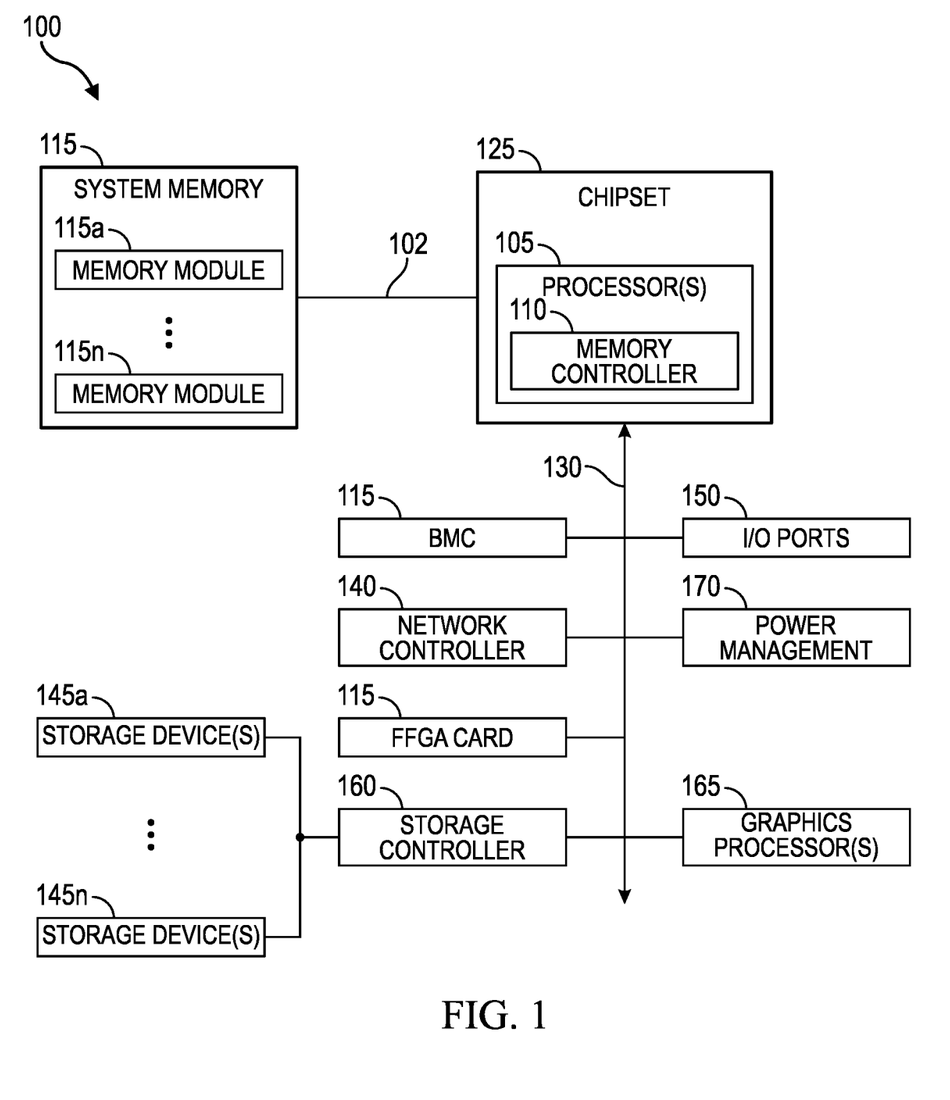
FIG. 1 is a block diagram illustrating components of an example of an Information Handling System (IHS), according to some embodiments.

For purposes of this disclosure, an Information Handling System (IHS) may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may, in accordance with embodiments of the present systems and methods, be a server (e.g., blade server, compute sled, storage sled, etc.), an Enclosure Controller (EC) (e.g., a modular IHS chassis EC) or any other suitable device and may vary in size, shape, performance, functionality, and price. The IHS may include random access memory (RAM), one or more processing resources such as a central processing unit (CPU) or hardware or software control logic, ROM, and/or other types of nonvolatile memory. Additional components of the IHS may include one or more disk drives, one or more network ports for communicating with external devices as well as various input and output (I/O) devices, such as a keyboard, a mouse, touchscreen and/or a video display. The IHS may also include one or more buses operable to transmit communications between the various hardware components. For example, FIG. 1 is a block diagram illustrating components of an example of an IHS, according to some embodiments.

IHS 100 may utilize one or more processors 105. In some embodiments, processors 105 may include a main processor and a co-processor, each of which may include a plurality of processing cores that, in certain scenarios, may each be used to run an instance of a server process. In certain embodiments, one or all of processor(s) 105 may be graphics processing units (GPUs) in scenarios where IHS 100 has been configured to support functions such as multimedia services and graphics applications.

As illustrated, processor(s) 105 includes an integrated memory controller 110 that may be implemented directly within the circuitry of the processor 105, or the memory controller 110 may be a separate integrated circuit that is located on the same die as the processor 105. The memory controller 110 may be configured to manage the transfer of data to and from the system memory 115 of the IHS 105 via a high-speed memory interface 120. The system memory 115 is coupled to processor(s) 105 via a memory bus 120 that provides the processor(s) 105 with high-speed memory used in the execution of computer program instructions by the processor(s) 105. Accordingly, system memory 115 may include memory components, such as static RAM (SRAM), dynamic RAM (DRAM), NAND Flash memory, suitable for supporting high-speed memory operations by the processor(s) 105. In certain embodiments, system memory 115 may combine both persistent, non-volatile memory and volatile memory.

In certain embodiments, the system memory 115 may be comprised of multiple removable memory modules. The system memory 115 of the illustrated embodiment includes removable memory modules 115a-n. Each of the removable memory modules 115a-n may correspond to a printed circuit board memory socket that receives a removable memory module 115a-n, such as a DIMM (Dual In-line Memory Module), that can be coupled to the socket and then decoupled from the socket as needed, such as to upgrade memory capabilities or to replace faulty memory modules. Other embodiments of IHS memory 115 may be configured with memory socket interfaces that correspond to different types of removable memory module form factors, such as a Dual In-line Package (DIP) memory, a Single In-line Pin Package (SIPP) memory, a Single In-line Memory Module (SIMM), and/or a Ball Grid Array (BGA) memory.

IHS 100 may utilize chipset 125 that may be implemented by integrated circuits that are coupled to processor(s) 105. In this embodiment, processor(s) 105 is depicted as a component of chipset 125. In other embodiments, all of chipset 125, or portions of chipset 125 may be implemented directly within the integrated circuitry of processor(s) 105. The chipset may provide the processor(s) 105 with access to a variety of resources accessible via one or more buses 130. Various embodiments may utilize any number of buses to provide the illustrated pathways served by bus 130. In certain embodiments, bus 130 may include a PCIe switch fabric that is accessed via a PCIe root complex.

As illustrated, IHS 100 includes BMC 135 to provide capabilities for remote monitoring and management of various aspects of IHS 100. In support of these operations, BMC 135 may utilize both in-band, sideband and/or out of band communications with certain managed components of IHS 100, such as, for example, processor(s) 105, system memory 115, chipset 125, network controller 135, storage device(s) 145, etc. BMC 135 may be installed on the motherboard of IHS 100 or may be coupled to IHS 100 via an expansion slot provided by the motherboard. As a non-limiting example of a BMC, the integrated Dell Remote Access Controller (iDRAC) from Dell® is embedded within Dell PowerEdge™ servers and provides functionality that helps information technology (IT) administrators deploy, update, monitor, and maintain servers remotely. BMC 135 may include non-volatile memory having program instructions stored thereon that are usable by CPU(s) 105 to enable remote management of IHS 100. For example, BMC 135 may enable a user to discover, configure, and manage BMC 135, setup configuration options, resolve and administer hardware or software problems, etc. Additionally, or alternatively, BMC 135 may include one or more firmware volumes, each volume having one or more firmware files used by the BIOS' firmware interface to initialize and test components of IHS 100.

IHS 100 may also include the one or more I/O ports 150, such as USB ports, PCIe ports, TPM (Trusted Platform Module) connection ports, HDMI ports, audio ports, docking ports, network ports, Fibre Channel ports and other storage device ports. Such I/O ports 150 may be externally accessible or may be internal ports that are accessed by opening the enclosure of the IHS 100. Through couplings made to these I/O ports 150, users may couple the IHS 100 directly to other IHSs, storage resources, external networks and a vast variety of peripheral components.

As illustrated, IHS 100 may include one or more FPGA (Field-Programmable Gate Array) cards 155. Each of the FPGA card 155 supported by IHS 100 may include various processing and memory resources, in addition to an FPGA logic unit that may include circuits that can be reconfigured after deployment of IHS 100 through programming functions supported by the FPGA card 155. Through such reprogramming of such logic units, each individual FGPA card 155 may be optimized to perform specific processing tasks, such as specific signal processing, security, data mining, and artificial intelligence functions, and/or to support specific hardware coupled to IHS 100. In some embodiments, a single FPGA card 155 may include multiple FPGA logic units, each of which may be separately programmed to implement different computing operations, such as in computing different operations that are being offloaded from processor 105.

IHS 100 may include one or more storage controllers 160 that may be utilized to access storage devices 145a-n that are accessible via the chassis in which IHS 100 is installed. Storage controller 160 may provide support for RAID (Redundant Array of Independent Disks) configurations of logical and physical storage devices 145a-n. In some embodiments, storage controller 160 may be an HBA (Host Bus Adapter) that provides more limited capabilities in accessing physical storage devices 145a-n. In some embodiments, storage devices 145a-n may be replaceable, hot-swappable storage devices that are installed within bays provided by the chassis in which IHS 100 is installed. In embodiments where storage devices 145a-n are hot-swappable devices that are received by bays of chassis, the storage devices 145a-n may be coupled to IHS 100 via couplings between the bays of the chassis and a midplane of IHS 100. In some embodiments, storage devices 145a-n may also be accessed by other IHSs that are also installed within the same chassis as IHS 100. Storage devices 145a-n may include SAS (Serial Attached SCSI) magnetic disk drives, SATA (Serial Advanced Technology Attachment) magnetic disk drives, solid-state drives (SSDs) and other types of storage devices in various combinations.

Processor(s) 105 may also be coupled to a network controller 135 via bus 130, such as provided by a Network Interface Controller (NIC) that allows the IHS 100 to communicate via an external network, such as the Internet or a LAN. In some embodiments, network controller 135 may be a replaceable expansion card or adapter that is coupled to a motherboard connector of IHS 100. In some embodiments, network controller 135 may be an integrated component of IHS 100.

A variety of additional components may be coupled to processor(s) 105 via bus 130. For instance, processor(s) 105 may also be coupled to a power management unit 165 that may interface with a power supply of IHS 100. In certain embodiments, a graphics processor 170 may be comprised within one or more video or graphics cards, or an embedded controller, installed as components of the IHS 100.

In certain embodiments, IHS 100 may operate using a BIOS (Basic Input/Output System) that may be stored in a non-volatile memory accessible by the processor(s) 105. The BIOS may provide an abstraction layer by which the operating system of the IHS 100 interfaces with the hardware components of the IHS. Upon powering or restarting IHS 100, processor(s) 105 may utilize BIOS instructions to initialize and test hardware components coupled to the IHS, including both components permanently installed as components of the motherboard of IHS 100, and removable components installed within various expansion slots supported by the IHS 100. The BIOS instructions may also load an operating system for use by the IHS 100. In certain embodiments, IHS 100 may utilize Unified Extensible Firmware Interface (UEFI) in addition to or instead of a BIOS. In certain embodiments, the functions provided by a BIOS may be implemented, in full or in part, by the remote access controller 160. In some embodiments, BIOS may be configured to identify hardware components that are detected as being currently installed in IHS 100. In such instances, the BIOS may support queries that provide the described unique identifiers that have been associated with each of these detected hardware components by their respective manufacturers. In providing an abstraction layer by which hardware of IHS 100 is accessed by an operating system, BIOS may identify the I/O ports 150 that are recognized and available for use.

In some embodiments, IHS 100 may include a TPM (Trusted Platform Module) that may include various registers, such as platform configuration registers, and a secure storage, such as an NVRAM (Non-Volatile Random-Access Memory). The TPM may also include a cryptographic processor that supports various cryptographic capabilities. In IHS embodiments that include a TPM, a pre-boot process implemented by the TPM may utilize its cryptographic capabilities to calculate hash values that are based on software and/or firmware instructions utilized by certain core components of IHS, such as the BIOS and boot loader of IHS 100. These calculated hash values may then be compared against reference hash values that were previously stored in a secure non-volatile memory of the IHS, such as during factory provisioning of IHS 100. In this manner, a TPM may establish a root of trust that includes core components of IHS 100 that are validated as operating using instructions that originate from a trusted source.

In various embodiments, an IHS 100 does not include each of the components shown in FIG. 1. In various embodiments, an IHS 100 may include various additional components in addition to those that are shown in FIG. 1. Furthermore, some components that are represented as separate components in FIG. 1 may in certain embodiments instead be integrated with other components. For example, in certain embodiments, all or a portion of the functionality provided by the illustrated components may instead be provided by components integrated into the one or more processor(s) 105 as a systems-on-a-chip.

A person of ordinary skill in the art will appreciate that IHS 100 is merely illustrative and is not intended to limit the scope of the disclosure described herein. In particular, any computer system and/or device may include any combination of hardware or software capable of performing certain operations described herein. In addition, the operations performed by the illustrated components may, in some embodiments, be performed by fewer components or distributed across additional components. Similarly, in other embodiments, the operations of some of the illustrated components may not be performed and/or other additional operations may be available.

Figure 2:
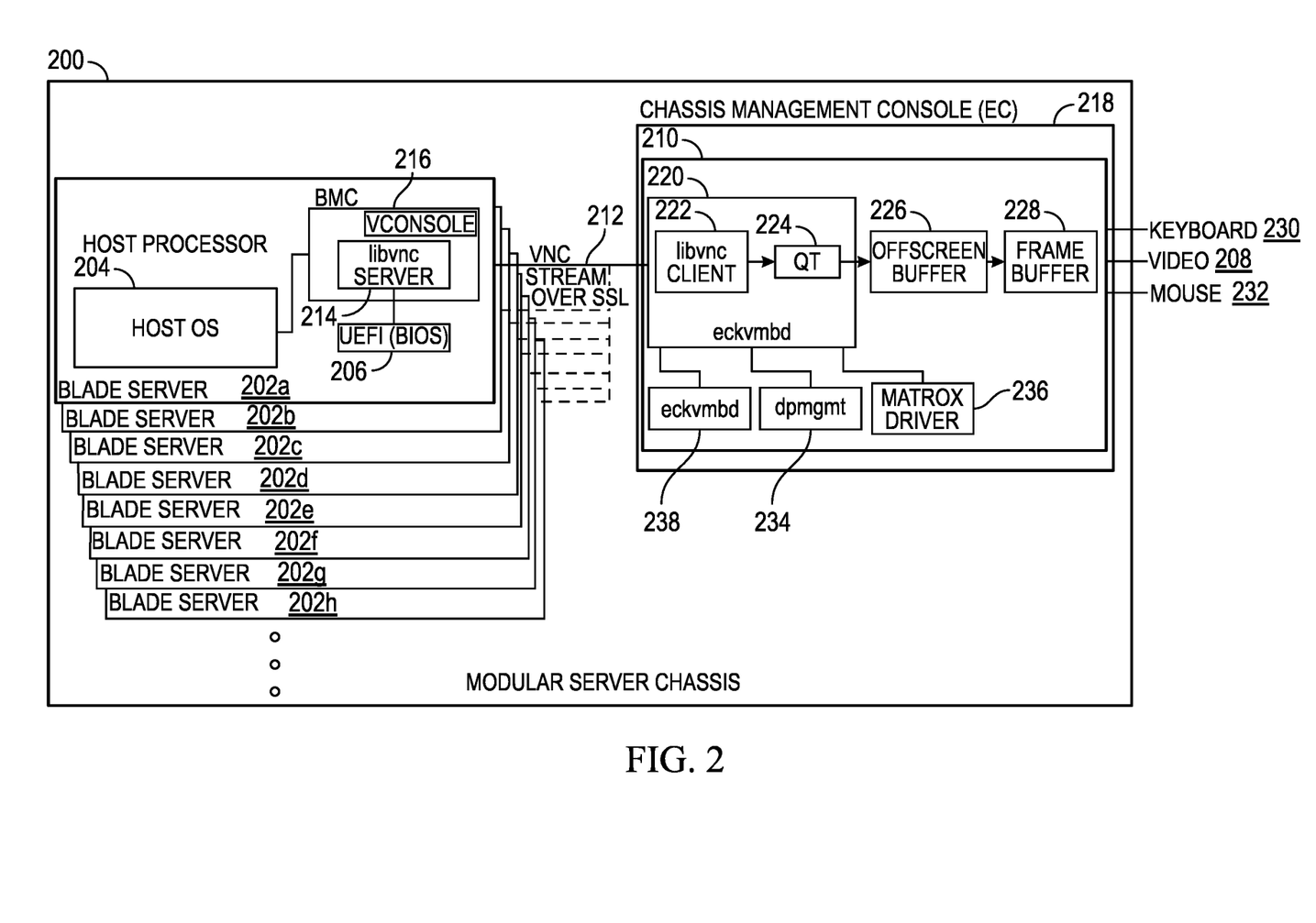
FIG. 2 is a block diagram illustrating components of an example modular IHS chassis and existing Keyboard, Video and Mouse (KVM) architecture.

FIG. 2 is a block diagram illustrating components of an example existing modular IHS chassis 200 and existing Keyboard, Video and Mouse (KVM) architecture employed therein. Blade servers (e.g., blade servers, compute sleds, storage sleds, or the like) 202a through 202h (etc.) installed in modular IHS chassis 200 (each) run a host operating system (204). At the user's (operator's/owner's) choice, or in response to UEFI/BIOS 206, screens may typically be displayed on monitor 208 connected to chassis 200 via KVM module 210. Virtual Network Computing (VNC) stream 212 comprises video from blade server (202a through 202h (etc.)), processed by VNC server 214 running in bade BMC 216 and converted to digital data stream 212 to be sent on a network using SSL tunnelling, or the like. VNC stream 212 may comprise encrypted and/or compressed data that complies with an VNC protocol and each graphics data packet in VNC stream 212 may include multiple regions (rectangles) of screen that had changes since a last-streamed. KVM module 210 of EC 218 may include "eckvmfd" (enclosure controller keyboard, video, mouse foreground daemon) 220 may comprise two primary components "libvnc" (library VNC) client 222 and "Qt" 224. The libvnc client (222) is a cross-platform C library that enables implementation of VNC server or client functionality in an application and is responsible for receiving graphics data from blade server host operating system 204. The client unpacks graphics data using the VNC protocol and stores pixel data in off screen frame buffer memory 226 allocated by eckvmfd 220. Qt 224 may be notified when a region (rectangle) of data is ready to be rendered Qt 224 is an open-source user interface development framework primarily targeted for embedded systems. In eckvmfd 220, Qt 224 is responsible for converting the pixel data unpacked by libvnc client 222 into a "QImage" format. This Qimage is then saved to off-screen buffer 226 for subsequent rendering at the discretion of Qt. Off-screen buffer 226 is user space memory, allocated by eckvmfd process 220. As noted, Qt 224 uses this memory to render the video data received from libvnc client 222 and save it in an image format. Frame buffer 228 is dedicated DRAM memory reserved for graphics-related operation to present video pixel data on monitor 208. Window management systems make use of off-screen buffer 226 to represent individual application screens which are then composed, and the final image is written to frame buffer 228. Thereby, KVM (keyboard 230, video and mouse 232) acting as input and output devices connected to modular IHS chassis 200 (e.g., to a control panel, or the like, of chassis 200) may enable a user to interact with blade server host operating system 204, BIOS 206, etc. using the KVM. The above-described video from the blade server host is displayed on monitor 208 connected via, by way of example, a mini display port. The "dpmgmt" (display port management) module (234) of KVM module 210 may be responsible for detecting the type of monitor (208) connected to modular IHS chassis 200. This dpmgmt module (234) identifies the monitor's resolution, color depth and other hardware display capabilities and may negotiate the optimal graphics performance parameters. Matrox device driver 236 may be responsible for transferring frame buffer data to the monitor via a graphics processor, or the like. Also, "eckvmbd" (enclosure controller keyboard, video, mouse background daemon) 238 may be responsible for maintaining a persistent configuration of modular chassis components.

Figure 3:
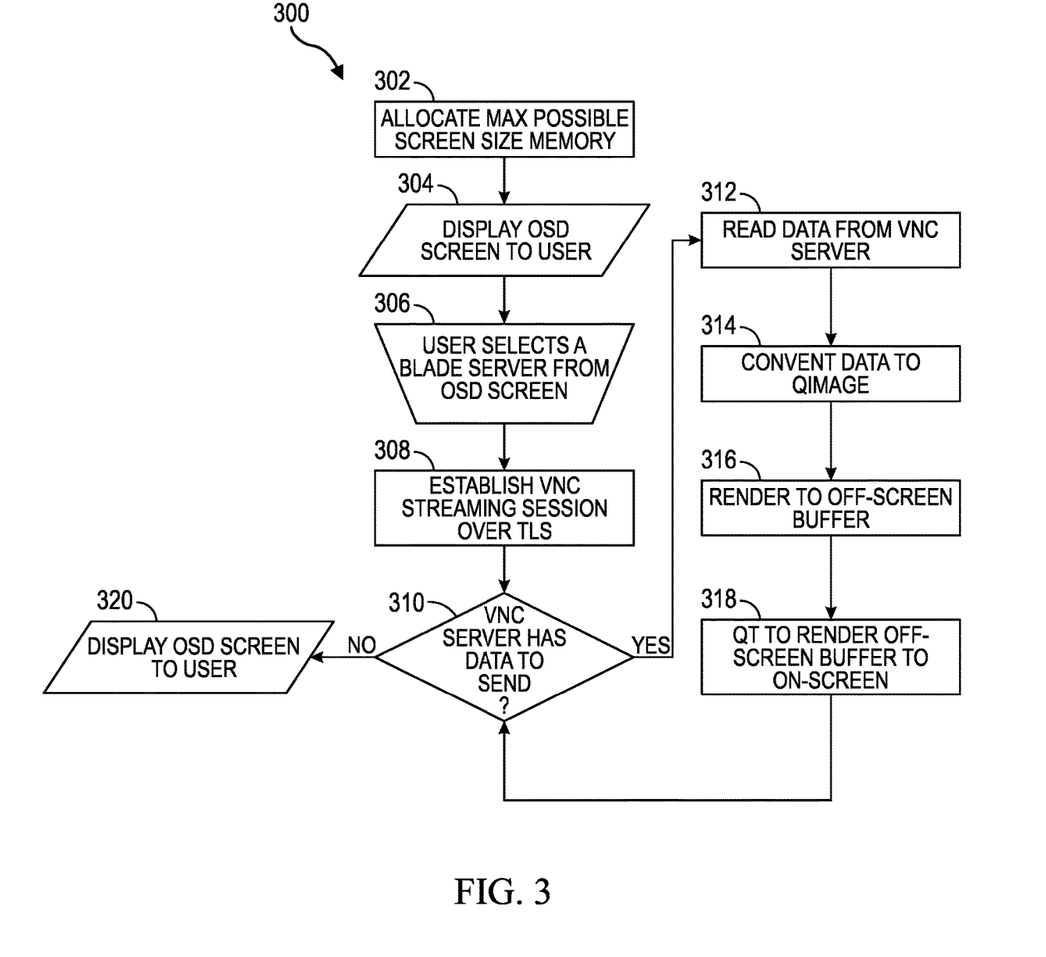
FIG. 3 is a flowchart illustrating existing KVM behavior with video rendering using an off-screen buffer.

Thus, in operation existing modular IHS chassis one-to-many KVM architecture 200, or the like may implement existing KVM behavior with video rendering using an off-screen buffer (226), such as illustrated in FIG. 3, which is a flowchart illustrating existing KVM behavior 300 with video rendering using an off-screen buffer. Therein, at 302, a maximum (possible) screen size memory is allocated, such as by eckvmfd 220. At 304, an on screen display (OSD) is displayed to a user, such that, at 306, user selection of a blade server from the onscreen display (screen) can be accepted. At 308, a VNC streaming session (212) over transport layer security (e.g., SSL) is established (such as by BCM 216 libvnc server 214), and at 310 a determination is made (such as by eckvmfd 220 libvnc client 222) as to whether the VNC server (214) has data to send via the VNC stream (212). If it is determined at 310 that VNC server (214) has data to send via the VNC stream (212), the data from the VNC server (214) is read at 312 (such as by eckvmfd 220 libvnc client 222).

Further, in accordance with existing KVM behavior 300 the data read from the VNC server (214) at 312 is converted to Qimage format (such as by eckvmfd 220 Qt 224) at 314. At 316 this Qimage is rendered to an off-screen buffer (226). Subsequently, at 318 Qt (224) renders the off screen buffer for display (such as on KVM monitor 208).

Existing KVM behavior 300 then returns to decide, at 310, (such as by eckvmfd 220 libvnc client 222) as to whether the VNC server (214) has (further) data to send via the VNC stream (212). If it is determined at 310 that VNC server (214) does not have data to send via the VNC stream (212), an OSD is again displayed (such as on KVM monitor 208, in the same manner as at 304) to the user at 320.

However, in such existing KVM systems and methods performance issues may be encountered, such as, while using the KVM feature the video display of the connected blade server may be very slow and sluggish (e.g., refreshes slowly). Due to this, a user may be unable to use, or at least make full use of the KVM feature of a modular IHS chassis. As described above, Qt is the graphics framework used in existing ECs to perform video display and windowing management. As also discussed, Qt uses an off-screen buffer (226) to render different windows and composes a unified image based on the visibility of each window. The composed image is finally written to a frame buffer (228) to present a KVM Graphical User Interface (GUI) to the user. The off-screen buffer ties up memory for intermediate storage and involves additional CPU processing to store and retrieve graphics data. This introduces delay in presenting graphics data streamed from the blade server (202). The existing Qt method of drawing the streamed data to the off-screen buffer (226), converting graphics data to QImage format (314), composing (316), and writing to the frame buffer (318) based on proprietary algorithm, is not optimized for real-time video display, and hence leads to poor video performance.

Embodiments of the present systems and methods offload the image rendering process directly to the frame buffer in the EC to bypass (eliminate) the Qt off-screen buffer operation (completely). The existing implementation of Qt off-screen buffering process induces, as noted above, (an) additional CPU processing cycle(s) which result(s) in the aforementioned slow and sluggish video performance issues. In accordance with embodiments of the present systems and methods, The EC (e.g., via the eckvmfd libvnc client) fetches the frame buffer address and writes the image directly on the KVM screen. In various embodiments, the frame buffer provides contiguous memory for the entire screen-resolution of the monitor in implementation of embodiments of the present systems and methods.

Additionally, existing KVM systems and methods do not offer a method to reserve an area of memory to show priority notifications and/or the OSD to the user. Embodiments of the present systems and methods provides a "soft-KVM" based implementation wherein a region of frame buffer memory may be restricted, or otherwise allocated, for use by the VNC, where the EC may show any priority notifications or contextual information, such as the OSD, in which user can select a different blade server to view its KVM video.

Figure 4:
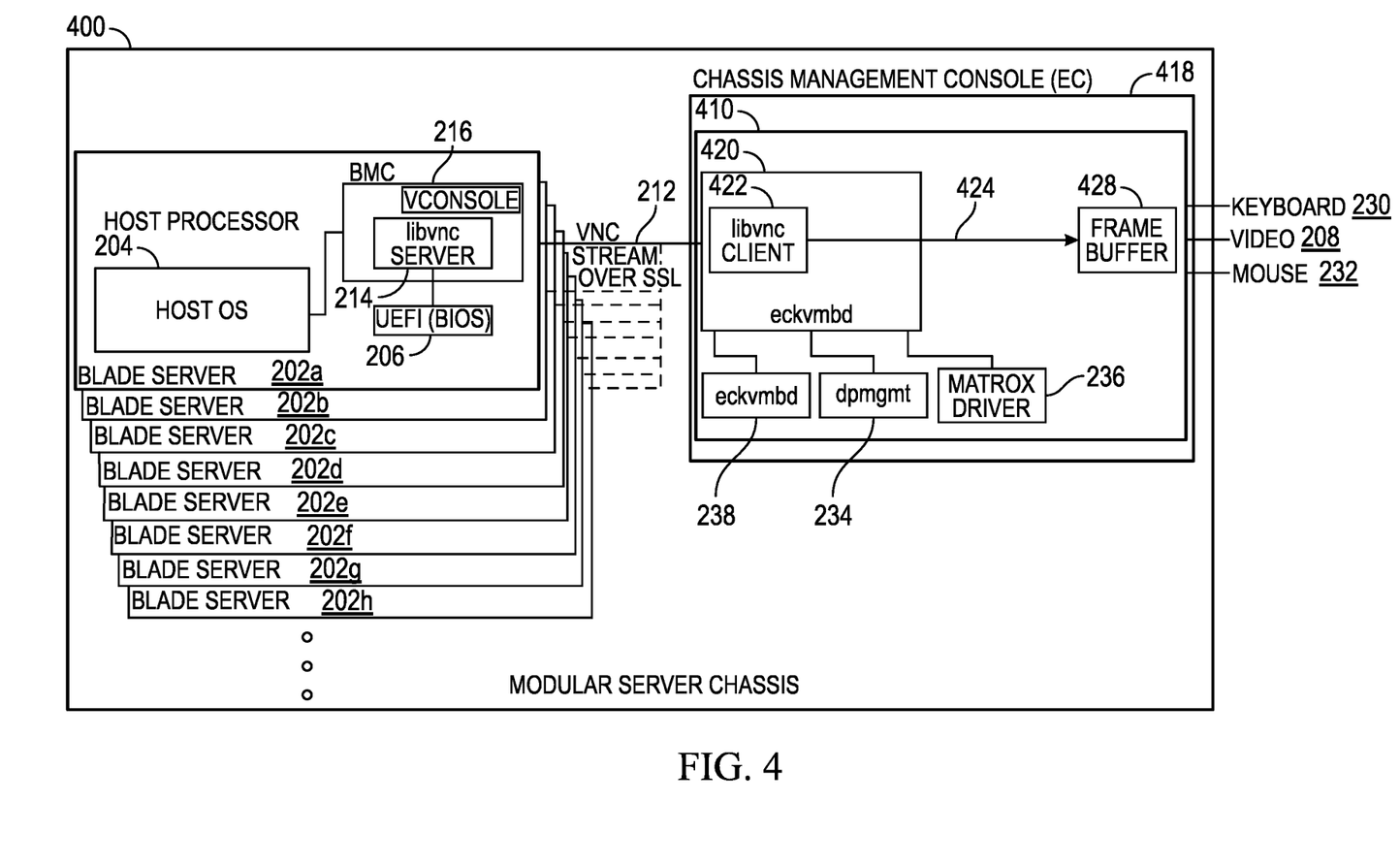
FIG. 4 is a block diagram illustrating components of the example modular IHS chassis of FIG. 2 and KVM architecture according to some embodiments of the present systems and methods.

FIG. 4 is a block diagram illustrating components of example modular IHS chassis 400, based on modular IHS chassis 200 of FIG. 2, showing one-to-many KVM architecture according to some embodiments of the present systems and methods. That is FIG. 4, illustrates the present one-to-many KVM architecture and highlights, particularly when compared with FIG. 2, the changes made in accordance with embodiments of the present systems and methods. For example, as with modular IHS chassis 200 of FIG. 2, modular IHS chassis 400 blade servers (e.g., blade servers, compute sleds, storage sleds, or the like) 202a through 202h (etc.) installed in modular IHS chassis 200 (each) run a host operating system (204). As noted, IHS server chassis 400 is a modular IHS chassis (as is existing modular IHS server chassis 200 described above). IHS server chassis 400 (and existing modular IHS server chassis 200) employs one-to-many server management (e.g., for KVM, etc.). In contrast, a rack server, or the like, employs one-to-one management (e.g., for KVM, etc.). Thus, at the user's (operator's/owner's) choice, or in response to UEFI/BIOS 206, screens may typically be displayed on monitor 208 connected to chassis 200 via KVM module 410. Virtual Network Computing (VNC) stream 212 comprises video from each blade server (202a through 202h (etc.)), processed by VNC server 214 running in bade BMC 216 and converted to digital data stream 212 to be sent on a network using SSL tunnelling, or the like. VNC stream 212 may comprise encrypted and/or compressed data that complies with an VNC protocol and each graphics data packet in VNC stream 212 may include multiple regions (rectangles) of screen that had changes since a last-streamed.

However, in accordance with embodiments of the present systems and methods, KVM module 410 of EC 418 may include eckvmfd 420 may comprise libvnc client 422. The Libvnc client 422 is also a cross-platform C library that enables implementation of VNC server or client functionality in an application and is responsible for receiving graphics data from blade server host operating system 204. Libvnc client 422 also unpacks graphics data using the VNC protocol and stores pixel data in off screen frame buffer memory 226 allocated by eckvmfd 220.

In accordance with embodiments of the present systems and methods, the one-to-many KVM architecture of KVM module 410 EC 418 eckvmfd 420 does not use a Qt module or offscreen buffer. Embodiments of the present systems and methods offloads image rendering process directly (i.e., via path 424) to frame buffer 428 in EC 400, avoiding Qt off-screen buffer operations and the like. This, as noted, reduces the image processing cycle workload of EC KVM module 420 by transferring the video pixel data from libvnc client 422 directly to frame buffer 428. As discussed below (and with respect to FIG. 5) EC 418 fetches the frame buffer address and writes the image directly on frame buffer 428. Embodiments of the present systems and methods significantly improve video streaming of data which results in a significant improvement in video performance display on the user facing display (208), as discussed below, with respect to FIGS. 6 through 8.

Frame buffer 428 is also dedicated DRAM memory reserved for graphics-related operation to present video pixel data on monitor 208. In accordance with embodiments of the present systems and methods, a final image is written directly to frame buffer 428 by eckvmfd 420. Thereby, KVM (keyboard 230, video 208 and mouse 232) acting as input and output devices connected to modular IHS chassis 400 (e.g., to a control panel, or the like, of chassis 400) may better enable a user to interact with blade server host operating system 204, BIOS 206, etc. using the KVM, in accordance with embodiments of the present systems and methods. The above-described video from the blade server host, provided directly from eckvmfd 420 to frame buffer 428, is also displayed on monitor 208 connected via, by way of example, a mini display port. Dpmgmt module 234 of KVM module 410 may also be responsible for detecting the type of monitor (208) connected to modular IHS chassis 400. Dpmgmt module 234 of KVM module 410 may also identify the monitor's resolution, color depth and other hardware display capabilities and may negotiate the optimal graphics performance parameters. Matrox device driver 236 of KVM module 410 may also be responsible for transferring frame buffer data to the monitor via a graphics processor, or the like. Also, eckvmbd 238 may be responsible for maintaining a persistent configuration of modular chassis components, in accordance with embodiments of the present systems and methods.

Thusly, embodiments of the present systems and methods offload KVM image rendering process to the EC frame buffer memory and bypass the excessive Qt off-screen buffering discussed above. Thereby, embodiments of the present systems and methods leverage this offload of the KVM image rendering process to the EC frame buffer memory in the one-to-many devices management console of a modular IHS chassis EC to improve KVM video performance. Additionally, embodiments of the present systems and methods may conceal a region of frame buffer memory from the VNC server and stream for use by the modular IHS chassis EC to render priority notifications, (a) context-based (OSD) menu(s), or the like.

Figure 5:
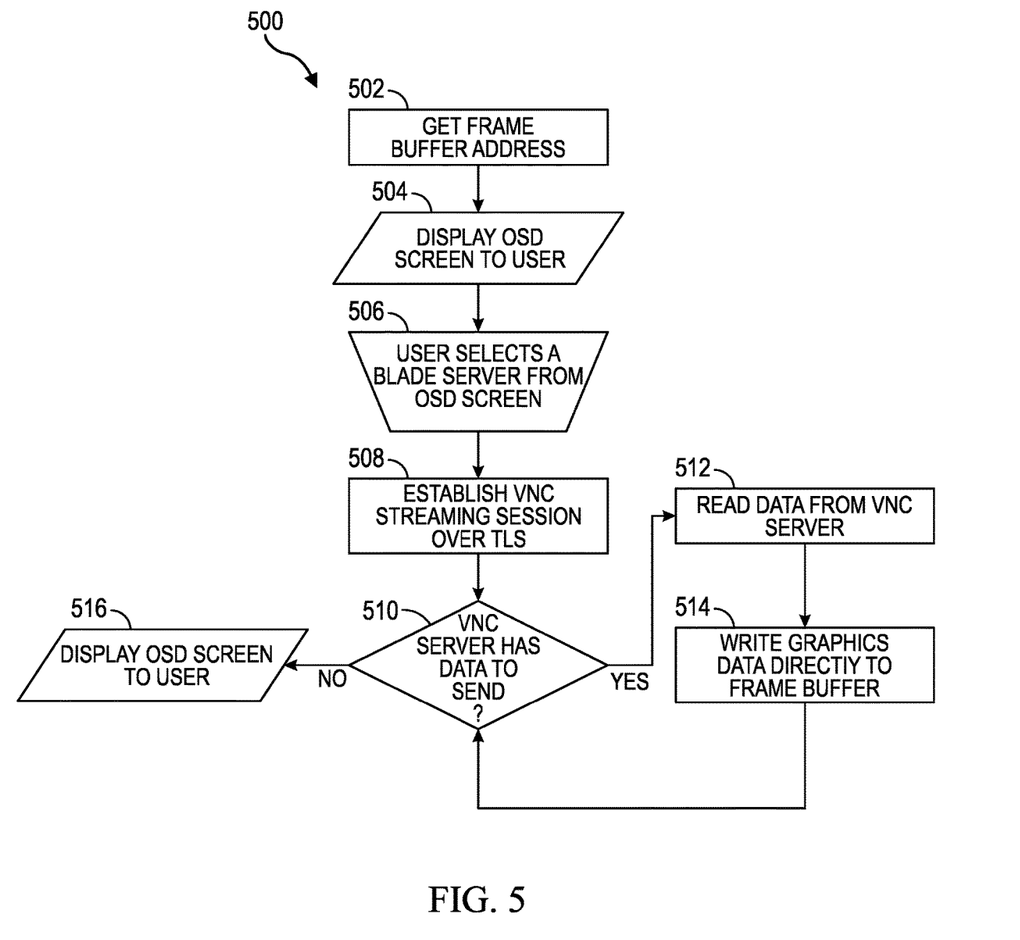
FIG. 5 is a flowchart illustrating KVM behavior with video rendering using direct video rendering, according to some embodiments of the present systems and methods.

Consistent with the foregoing, and embodiments of the present systems and methods, modular IHS chassis one-to-many KVM architecture 400, or the like, may, in operation, implement KVM behavior in accordance with embodiments of the present systems and methods such as illustrated in FIG. 5. That is, FIG. 5 is a flowchart illustrating KVM behavior 500 with video rendering using direct rendering (424), to a frame buffer (428), according to some embodiments of the present systems and methods. Therein, at 502, a frame buffer (memory) address is fetched, or otherwise retrieved, determined, or the like, by the eckvmfd libvnc client (422), or the like. In accordance with embodiments of the present systems and methods, this frame buffer (428) provides contiguous memory for the entire screen-resolution of the KVM monitor (208). Also, this, or in some embodiments a different, region of frame buffer memory may be restricted for use by VNC where the EC (418) can show any priority notifications or other contextual information such as an OSD, in which user can select a different blade server, in order to view its KVM video output). For example, at 504, an OSD is displayed to a user, such that, at 506, user selection of a blade server from the onscreen display (screen) can be accepted at 506. At 508, a VNC streaming session (212) (from the selected blade server) over transport layer security (e.g., SSL) is established (such as by BCM 216 libvnc server 214). At 510 a determination is made (such as by eckvmfd 420 libvnc client 422) as to whether the VNC server (214) has data to send via the VNC stream (212). If it is determined at 510 that VNC server (214) has data to send via the VNC stream (212), the data from the VNC server (214) is read at 312 (such as by eckvmfd 420 libvnc client 422). Then, at 514, this graphics data from the VNC server (214) is written (such as by eckvmfd 420 libvnc client 422) (directly) to the frame buffer memory (428) address fetched at 502, for subsequent display to the KVM monitor (208). KVM behavior 400 then returns to decide, at 510, (such as by eckvmfd 420 libvnc client 422) as to whether the VNC server (214) has (further) data to send via the VNC stream (212). If it is determined at 510 that VNC server (214) does not have data to send via the VNC stream (212), an OSD is again displayed (such as on KVM monitor 208, in the same manner as at 504) to the user at 516.

This implementation (500) of the modular chassis one-to-many KVM architecture (400), in accordance with embodiments of the present systems and methods, in a modular IHS server chassis that employs one-to-many server management (e.g., for KVM, etc.) eliminates the usage of a Qt module (224) typically present in the eckvmfd (220) and the offscreen buffer (226). Embodiments of the present systems and methods (completely) offloads the image rendering process directly to the frame buffer (428) in the EC (418) and enables bypass, elimination, or the like, of the Qt off-screen buffer operation (314 through 318). Embodiments of the present systems and methods reduces the image processing cycle workload from the EC module (418) by transferring the video pixel data from the libvnc client (422) directly to the frame buffer (428). In operation, embodiments of the present systems and methods significantly improve the video streaming of data which resulted in significant improvement in video performance display on the user facing display (208). As noted, the previous implementation of Qt off-screen buffering process induces an additional processing cycle which results in slow and sluggish video performance issues. With the preset implementations, EC 418 fetches the frame buffer address at 502 and writes the image directly on Frame Buffer 428 at 518.

Figure 6:
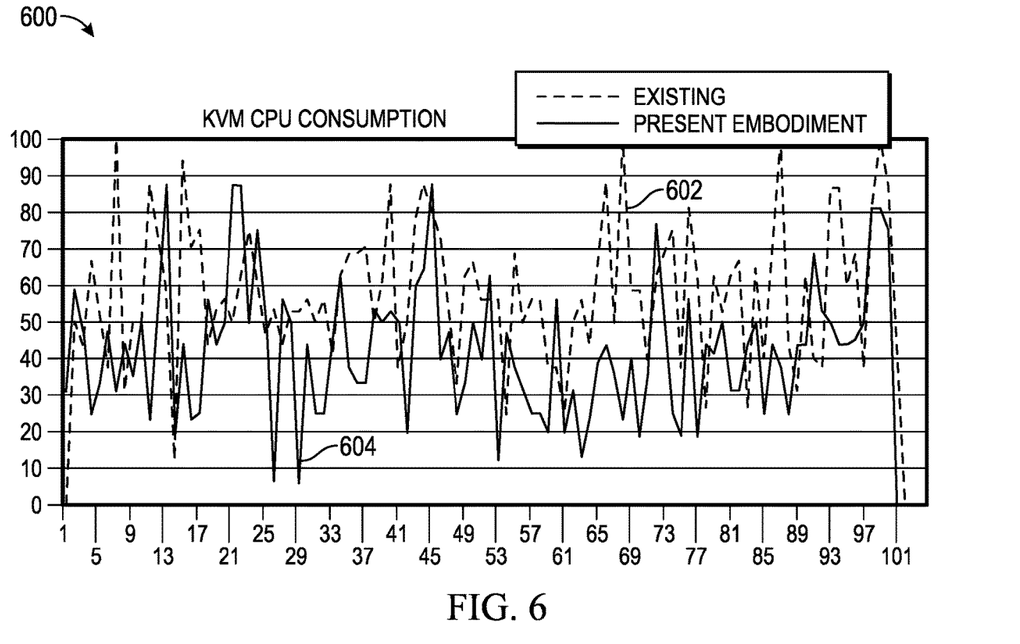
FIG. 6 is a chart comparing existing KVM CPU usage to KVM CPU usage under some embodiments of the present systems and methods.
Figure 7:
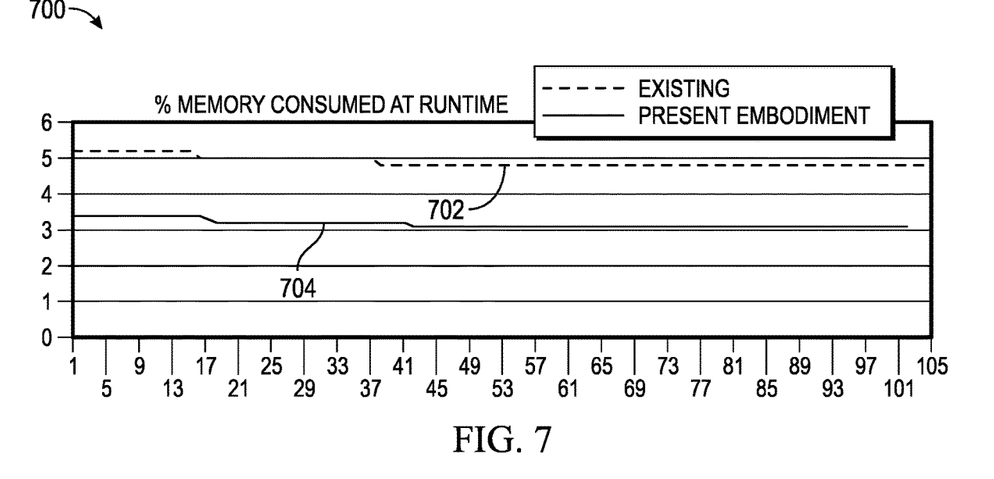
FIG. 7 is a chart comparing existing KVM memory usage to KVM memory usage under some embodiments of the present systems and methods.
Figure 8:
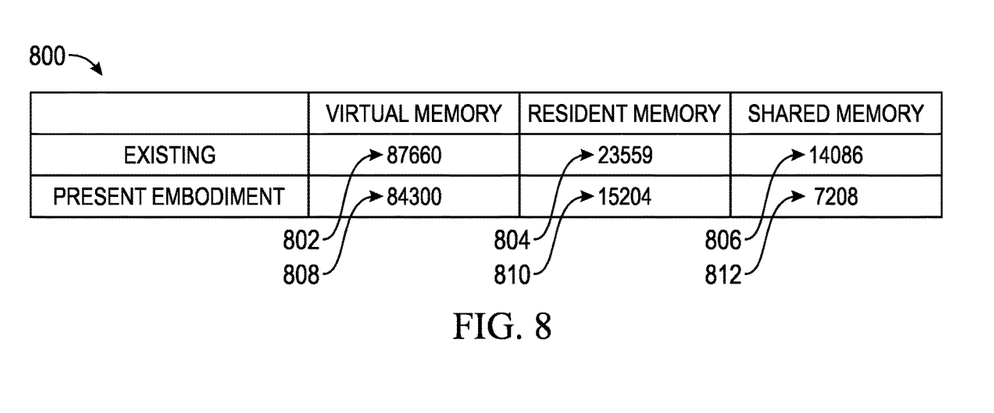
FIG. 8 is a table comparing existing KVM virtual, resident to shared memory usage and KVM virtual, resident and shared memory usage under some embodiments of the present systems and methods.

Resource (EC CPU, EC memory) optimization is attained in accordance with implementation of embodiments of the present systems and methods, such as through implementation in a modular IHS chassis mounting a plurality of blade servers, particularly a Dell® PowerEdge™ MX7000 modular chassis, by way of example. FIG. 6 is chart 600 comparing example existing KVM CPU usage 602 to example KVM CPU usage 604 under embodiments of the present systems and methods in such an implementation. FIG. 7 is chart 700 comparing example existing KVM memory usage 702 to example KVM memory usage 704 under embodiments of the present systems and methods in such an implementation. As shown therein, as a result of bypassing the off-screen buffer, immediate savings of 4.6 MB of DRAM (on a default 1024×768 resolution), or the like, is (directly) achieved. Correspondingly, FIG. 8 is table 800 comparing example memory utilization (in bytes) at runtime, including existing KVM virtual memory usage 802, resident memory usage 804 and shared memory usage 806 compared to example KVM virtual memory usage 808, resident memory usage 810 and shared memory usage 812 under embodiments of the present systems and methods. As one of skill in the art will appreciate, such processing and memory savings are a marked improvement over existing modular server chassis KVM video rendering systems and methods, not only in degree, but in kind.

It should be understood that various operations described herein may be implemented in software executed by processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

To implement various operations described herein, computer program code (i.e., instructions for carrying out these operations) may be written in any combination of one or more programming languages, including an object-oriented programming language such as Java, Smalltalk, Python, C++, or the like, conventional procedural programming languages, such as the "C" programming language or similar programming languages, or any of machine learning software. These program instructions may also be stored in a computer readable storage medium that can direct a computer system, other programmable data processing apparatus, controller, or other device to operate in a particular manner, such that the instructions stored in the computer readable medium produce an article of manufacture including instructions which implement the operations specified in the block diagram block or blocks. The program instructions may also be loaded onto a computer, other programmable data processing apparatus, controller, or other device to cause a series of operations to be performed on the computer, or other programmable apparatus or devices, to produce a computer implemented process such that the instructions upon execution provide processes for implementing the operations specified in the block diagram block or blocks.

Reference is made herein to "configuring" a device or a device "configured to" perform some operation(s). It should be understood that this may include selecting predefined logic blocks and logically associating them. It may also include programming computer software-based logic of a retrofit control device, wiring discrete hardware components, or a combination of thereof. Such configured devices are physically designed to perform the specified operation(s).

Modules implemented in software for execution by various types of processors may, for instance, include one or more physical or logical blocks of computer instructions, which may, for instance, be organized as an object or procedure. Nevertheless, the executables of an identified module need not be physically located together but may include disparate instructions stored in different locations which, when joined logically together, include the module and achieve the stated purpose for the module. Indeed, a module of executable code may be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different storage devices.

The terms "tangible" and "non-transitory," as used herein, are intended to describe a computer-readable storage medium (or "memory") excluding propagating electromagnetic signals; but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains"

one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

The invention claimed is:

1. A method to offload on-premises keyboard video and mouse server live video rendering processes to modular server chassis frame buffer memory comprising:
   fetching, by a modular server chassis enclosure controller virtual network computing client process, a modular server chassis enclosure controller frame buffer memory address;
   displaying, by the modular server chassis enclosure controller, an on-screen display screen to a user;
   accepting, by the modular server chassis enclosure controller, user selection of a blade server deployed in the modular server chassis from the on-screen display;
   establish, by a virtual network computing server process of the selected blade server, a virtual network computing streaming session over transport layer security to the modular server chassis enclosure controller virtual network computing client process;
   determining, by the modular server chassis enclosure controller virtual network computing client process, whether the virtual network computing server process has data to send;
   reading, by the modular server chassis enclosure controller virtual network computing client process, graphics data from the virtual network computing server process, in response to a determination that the virtual network computing server has data to send;
   writing, by the modular server chassis enclosure controller virtual network computing client process, the graphics data that was read from the virtual network computing server to the modular server chassis enclosure controller frame buffer memory address; and
   displaying, from the modular server chassis enclosure controller frame buffer memory, the graphics data on an on-premises video monitor coupled to the modular server chassis.

2. The method of claim 1, wherein the modular server chassis enclosure controller is a one modular server chassis enclosure controller to a plurality of blade server, modular server chassis enclosure controller.

3. The method of claim 1, wherein, in response to the determination that the virtual network computing server has data to send, returning to displaying the on-screen display screen to the user and accepting user selection of a blade server from the on-screen display.

4. The method of claim 1, further comprising:
   restricting at least a portion of the modular server chassis enclosure controller frame buffer memory for use by the modular server chassis enclosure controller virtual network computing client process;
   writing, by the modular server chassis enclosure controller virtual network computing client process, the on-screen display to the resultingly restricted modular server chassis enclosure controller frame buffer memory; and
   displaying, from the restricted modular server chassis enclosure controller frame buffer memory, the on-screen display on the on-premises video monitor coupled to the modular server chassis.

5. The method of claim 1, further comprising:
   restricting at least a portion of the modular server chassis enclosure controller frame buffer memory for use by the modular server chassis enclosure controller virtual network computing client process;
   writing, by the modular server chassis enclosure controller virtual network computing client process, a priority notification to the resultingly restricted modular server chassis enclosure controller frame buffer memory; and
   displaying, from the restricted modular server chassis enclosure controller frame buffer memory, the priority notification on the on-premises video monitor coupled to the modular server chassis.

6. The method of claim 1, wherein the modular server chassis enclosure controller virtual network computing client process is a modular server chassis enclosure controller library virtual network computing client process.

7. The method of claim 1, wherein the virtual network computing server process is a library virtual network computing server process.

8. A modular server chassis enclosure controller comprising:
   an on-premises keyboard video and mouse module, the keyboard video and mouse module comprising:
      modular server chassis frame buffer memory; and
      a modular server chassis enclosure controller virtual network computing client process configured to:
         fetch a modular server chassis enclosure controller frame buffer memory address;
         display an on-screen display screen to a user;
         accept user selection of a blade server deployed in the modular server chassis from the on-screen display;
         receive, from a virtual network computing server process of the selected blade server, a virtual network computing streaming session over transport layer security;
         determine whether the virtual network computing server process has data to send;
         read, in response to a determination that the virtual network computing server has data to send, graphics data from the virtual network computing server process;
         write the graphics data from the virtual network computing server to the modular server chassis enclosure controller frame buffer memory address; and
         display, from the modular server chassis enclosure controller frame buffer memory, the graphics data on an on-premises video monitor coupled to the modular server chassis.

9. The modular server chassis enclosure controller of claim method of claim 8, wherein the modular server chassis enclosure controller is a one modular server chassis enclosure controller to a plurality of blade servers modular server chassis enclosure controller.

10. The modular server chassis enclosure controller of claim 8, wherein, the modular server chassis enclosure controller virtual network computing client process is further configured to display the on-screen display screen to the user in response to the determination that the virtual network computing server has data to send.

11. The modular server chassis enclosure controller of claim 8, wherein the modular server chassis enclosure controller virtual network computing client process is further configured to:
   restrict at least a portion of the modular server chassis enclosure controller frame buffer memory for use by the modular server chassis enclosure controller virtual network computing client process;
   write the on-screen display to the resultingly restricted modular server chassis enclosure controller frame buffer memory; and
   display, from the restricted modular server chassis enclosure controller frame buffer memory, the on-screen display on the on-premises video monitor coupled to the modular server chassis.

12. The modular server chassis enclosure controller of claim 8, wherein the modular server chassis enclosure controller virtual network computing client process is further configured to:
   restrict at least a portion of the modular server chassis enclosure controller frame buffer memory for use by the modular server chassis enclosure controller virtual network computing client process;
   write a priority notification to the resultingly restricted modular server chassis enclosure controller frame buffer memory; and
   display, from the restricted modular server chassis enclosure controller frame buffer memory, the priority notification on the on-premises video monitor coupled to the modular server chassis.

13. The modular server chassis enclosure controller of claim 8, wherein the modular server chassis enclosure controller virtual network computing client process is a modular server chassis enclosure controller library virtual network computing client process.

14. The modular server chassis enclosure controller of claim 8, wherein the virtual network computing server process is a library virtual network computing server process.

15. A non-transitory computer readable medium having program instructions stored thereon that, upon execution by a modular server chassis enclosure controller cause the modular server chassis enclosure controller to:
   fetch a modular server chassis enclosure controller frame buffer memory address;
   display an on-screen display screen to a user;
   accept user selection of a blade server deployed in the modular server chassis from the on-screen display;
   receive, from a virtual network computing server process of the selected blade server, a virtual network computing streaming session over transport layer security;
   determine whether the virtual network computing server process has data to send;
   read, in response to a determination that the virtual network computing server has data to send, graphics data from the virtual network computing server process;
   write the graphics data from the virtual network computing server to the modular server chassis enclosure controller frame buffer memory address; and
   display, from the modular server chassis enclosure controller frame buffer memory, the graphics data on an on-premises video monitor coupled to the modular server chassis.

16. The non-transitory computer readable medium of claim 15, wherein, upon execution by the modular server chassis enclosure controller, the program instructions further cause the modular server chassis enclosure controller to display the on-screen display screen to the user in response to the determination that the virtual network computing server has data to send.

17. The non-transitory computer readable medium of claim 15, wherein, upon execution by the modular server chassis enclosure controller, the program instructions further cause the modular server chassis enclosure controller to:
   restrict at least a portion of the modular server chassis enclosure controller frame buffer memory for use by the modular server chassis enclosure controller;
   write the on-screen display to the resultingly restricted modular server chassis enclosure controller frame buffer memory; and
   display, from the restricted modular server chassis enclosure controller frame buffer memory, the on-screen display on the on-premises video monitor coupled to the modular server chassis.

18. The non-transitory computer readable medium of claim 15, wherein, upon execution by the modular server chassis enclosure controller, the program instructions further cause the modular server chassis enclosure controller to:
   restrict at least a portion of the modular server chassis enclosure controller frame buffer memory for use by the modular server chassis enclosure;
   write a priority notification to the resultingly restricted modular server chassis enclosure controller frame buffer memory; and
   display, from the restricted modular server chassis enclosure controller frame buffer memory, the priority notification on the on-premises video monitor coupled to the modular server chassis.

19. The non-transitory computer readable medium of claim 15, wherein the modular server chassis enclosure controller is a one modular server chassis enclosure controller to a plurality of blade servers modular server chassis enclosure controller.

20. The non-transitory computer readable medium of claim 15, wherein the virtual network computing server process is a library virtual network computing server process.

* * * * *